United States Patent
Sun et al.

(10) Patent No.: US 9,599,958 B2
(45) Date of Patent: Mar. 21, 2017

(54) COLLINEAR HOLOGRAPHIC STORAGE MEDIUM

(75) Inventors: Ching-Cherng Sun, Taoyuan County (TW); Yeh-Wei Yu, Hsinchu County (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 1029 days.

(21) Appl. No.: 12/861,844

(22) Filed: Aug. 24, 2010

(65) Prior Publication Data

US 2011/0249308 A1    Oct. 13, 2011

(30) Foreign Application Priority Data

Apr. 8, 2010    (TW) ............................... 99110932 A (51) Int. Cl.
*G03H 1/02*    (2006.01)
*G11B 7/24044*    (2013.01)
*G11B 7/2467*    (2013.01)
*G03H 1/18*    (2006.01)

(52) U.S. Cl.
CPC ............ *G03H 1/02* (2013.01); *G03H 1/0256* (2013.01); *G11B 7/24044* (2013.01); *G11B 7/2467* (2013.01); *G03H 2001/0264* (2013.01); *G03H 2001/186* (2013.01); *G03H 2240/50* (2013.01)

(58) Field of Classification Search
CPC ............................................. G02H 2001/0264
USPC .................... 359/3, 1; 369/103, 94; 430/1, 2
See application file for complete search history.

(56) References Cited

U.S. PATENT DOCUMENTS

| | | | |
|---|---|---|---|
| 6,995,882 B2 | 2/2006 | Horimai | |
| 7,002,891 B2 | 2/2006 | Horimai | |
| 7,085,025 B2 | 8/2006 | Horimai | |
| 7,085,026 B2 | 8/2006 | Horimai | |
| 7,130,092 B1 | 10/2006 | Horimai | |
| 7,236,277 B2* | 6/2007 | Kawano et al. | ................. 359/3 |
| 7,321,541 B2 | 1/2008 | Horimai | |
| 7,521,154 B2 | 4/2009 | Trentler et al. | |
| 2004/0165518 A1* | 8/2004 | Horimai et al. | ............... 369/94 |
| 2006/0215528 A1* | 9/2006 | Hirao et al. | ................. 369/103 |
| 2008/0252951 A1 | 10/2008 | Knittel | |

FOREIGN PATENT DOCUMENTS

| | | |
|---|---|---|
| JP | 05-165388 | 7/1993 |
| JP | 8137373 A | 5/1996 |
| JP | 8-286589 | 11/1996 |
| JP | 2002-032001 | 1/2002 |
| JP | 2006-267554 | 10/2006 |
| JP | 2007-163643 | 6/2007 |

(Continued)

OTHER PUBLICATIONS

Study of Media Shrinkage in Collinear Holographic Storage System: the Effect of Random Phase Mask.

(Continued)

*Primary Examiner* — Audrey Y Chang
(74) *Attorney, Agent, or Firm* — CKC & Partners Co., Ltd.

(57) ABSTRACT

In the specification and drawings, a collinear holographic storage medium is described and shown with a recording layer, wherein the lateral linear thermal expansion coefficient of the recording layer is substantially the same as the linear thermal expansion coefficient of the material of the recording layer.

15 Claims, 5 Drawing Sheets

(56) References Cited

FOREIGN PATENT DOCUMENTS

| | | |
|---|---|---|
| JP | 2007-178780 | 7/2007 |
| TW | 200715274 | 4/2007 |
| TW | 200830303 | 7/2008 |
| TW | 200839753 | 10/2008 |
| TW | 200912914 | 3/2009 |
| TW | 200937407 | 9/2009 |

OTHER PUBLICATIONS

High density recording of 270 Gbits/inch2 in a coaxial holographic storage system.
Improved performance in coaxial holographic data recording.
Collinear holography.
Collinear technology for a holographic versatile disk.
Tunable blue laser compensates for thermal expansion of the medium in holographic data storage.
2006 ODS Temperature Compensation Strategy for holographic Storage.
Analytical solution to compensate for thermal expansion change in photopolymer volume holograms using a tunable laser.
Recording and reading temperature tolerance in holographic data storage, in relation to the anisotropic thermal expansion of a photopolymer.

* cited by examiner

COLLINEAR HOLOGRAPHIC STORAGE MEDIUM

RELATED APPLICATIONS

This application claims priority to Taiwan Application Serial Number 99110932, filed Apr. 8, 2010, which is herein incorporated by reference.

BACKGROUND

Technical Field

The present disclosure relates to holographic data storage. More particularly, the present disclosure relates to collinear holography.

Description of Related Art

Holographic data storage is a potential replacement technology in the area of high-capacity data storage. Holographic data storage research booms occurred several times in the past. However, holographic data storage is still a potential replacement technology, not a commercial data storage solution.

Collinear holography is one possible holographic data storage solution. In collinear holography, the signal beam and the reference beam are collinear and are focused onto the disk by the same lens. Traditionally, the signal beam located on the center surrounded by the reference beam. Collinear holography has a simple structure, a possibility of backwards-compatibility, a shorter optical path difference between the signal beam and the reference beam, a lower requirement for the coherence length of the laser beam, a better shift selectivity, a larger wavelength tolerance, a larger media tilt tolerance, high-capacity data storage, and high speed. Therefore, collinear holography has become the mainstream holographic data storage method.

SUMMARY

According to one embodiment of the present invention, a collinear holographic storage medium includes a recording layer. The lateral linear thermal expansion coefficient of the recording layer is substantially the same as the linear thermal expansion coefficient of the material of the recording layer.

According to another embodiment of the present invention, a collinear holographic storage medium includes a reflection layer and a recording layer. The recording layer is disposed above the reflection layer. The lateral linear thermal expansion coefficient of the recording layer substantially satisfies:

$$\alpha_L = \frac{-\alpha_n(1-v) + \alpha(1+v)}{2}$$

where $\alpha_L$ is the lateral linear thermal expansion coefficient of the recording layer, $\alpha_n$ is the temperature coefficient of the refractive index of the recording layer, $\alpha$ is the linear thermal expansion coefficient of the material of the recording layer, and $v$ is the Poisson's Ratio of the material of the recording layer.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
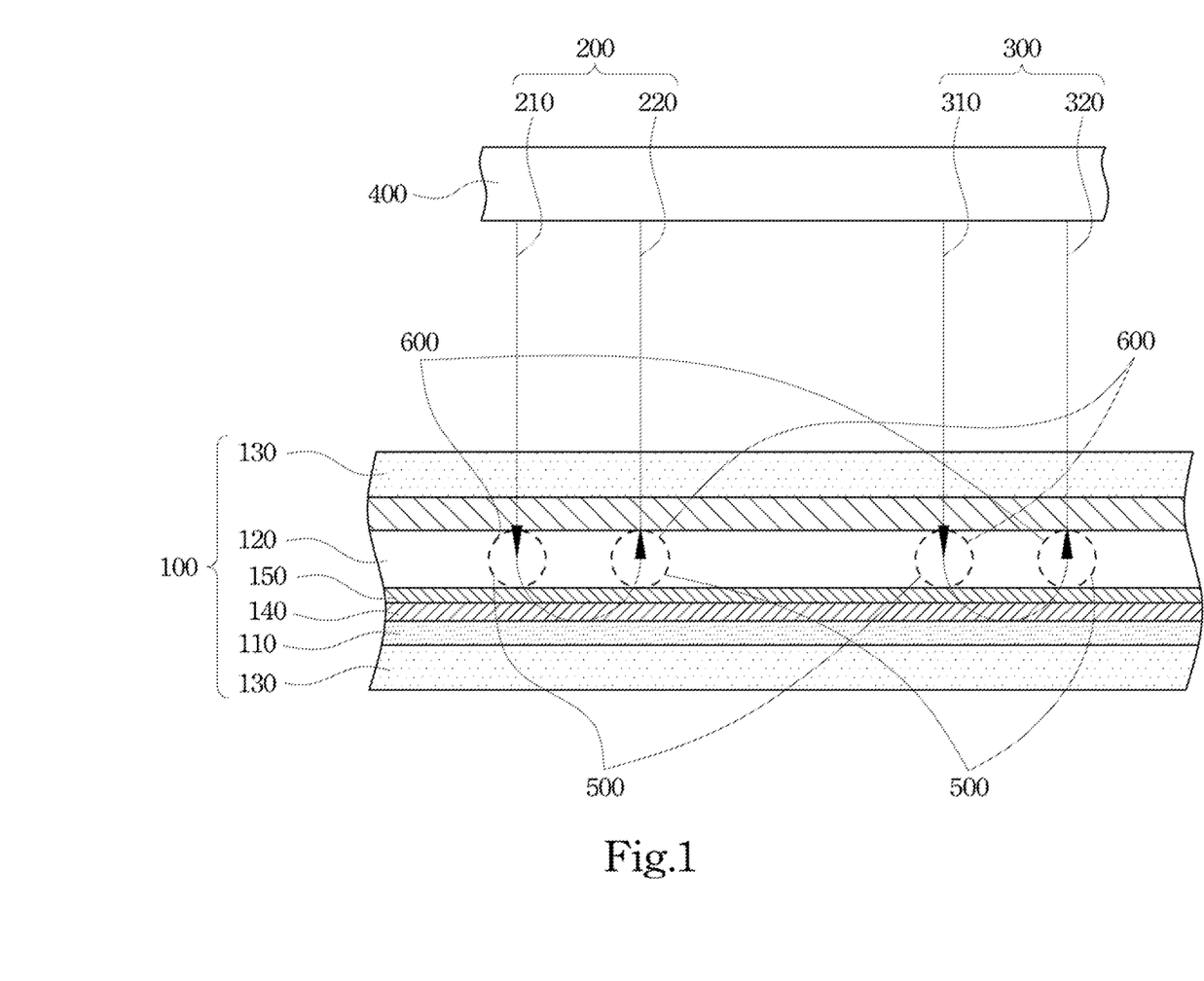
FIG. 1 is a sectional view of a collinear holographic storage medium when the data is written according to one embodiment of the present invention.

FIG. 1 is a sectional view of a collinear holographic storage medium 100 when the data is written according to one embodiment of the present invention. As shown in FIG. 1, the collinear holographic storage medium 100 includes a reflection layer 110 and a recording layer 120. The recording layer 120 is disposed above the reflection layer 110.

When the data is written, a spatial light modulator (SLM) can be used to provide a signal beam 200 and a reference beam 300. At least one lens 400 focuses the signal beam 200 and the reference beam 300 onto the reflection layer 110, thereby creating an interference pattern in the recording layer 120.

As shown in FIG. 1, there are transmission gratings 500 and reflection gratings 600 in the recording layer 120 due to the reflection layer 110. The transmission gratings 500 includes the gratings created by the incident signal beam 210 and the incident reference beam 310 and the gratings created by the reflected signal beam 220 and the reflected reference beam 320. The reflection gratings 600 includes the gratings created by the incident signal beam 210 and the reflected reference beam 320 and the gratings created by the reflected signal beam 220 and the incident reference beam 310. The transmission gratings 500 and the reflection gratings 600 have different physical properties.

Figure 2:
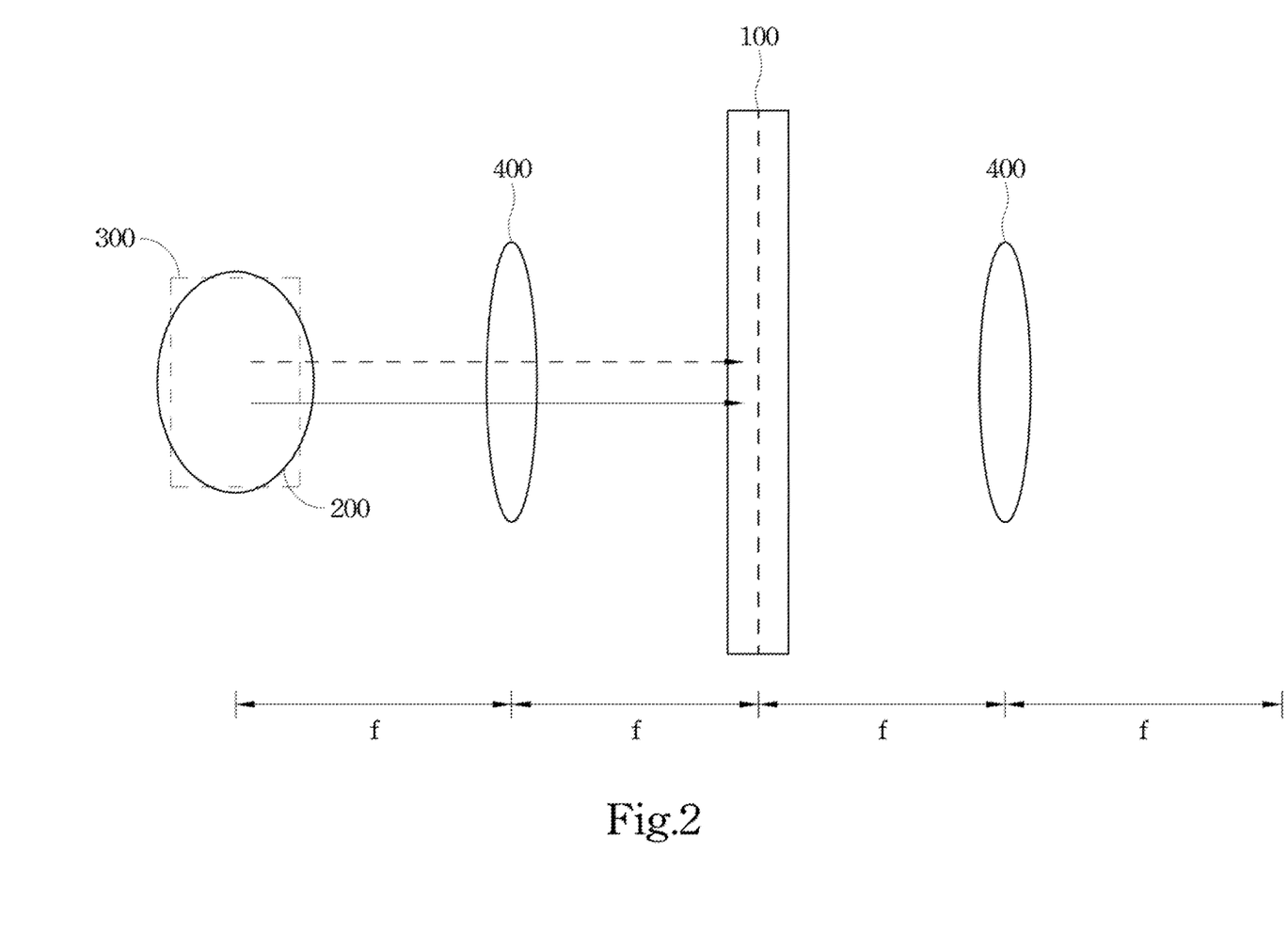
FIG. 2 is a schematic view of the transmission gratings of FIG. 1 when the data is written.

FIG. 2 is a schematic view of the transmission gratings 500 of FIG. 1 when the data is written. When the data is written, the spatial light modulator (SLM) provides a real image formed by the signal beam 200 and the reference beam 300 passing through the real image at the front focal plane of the lens 400, wherein the focal length of the lens 400 is f. The signal beam 200 and the reference beam 300 are collinear. The lens 400 focuses the signal beam 200 and the reference beam 300 onto the collinear holographic storage medium 100, thereby creating an interference pattern in the collinear holographic storage medium 100.

Figure 3:
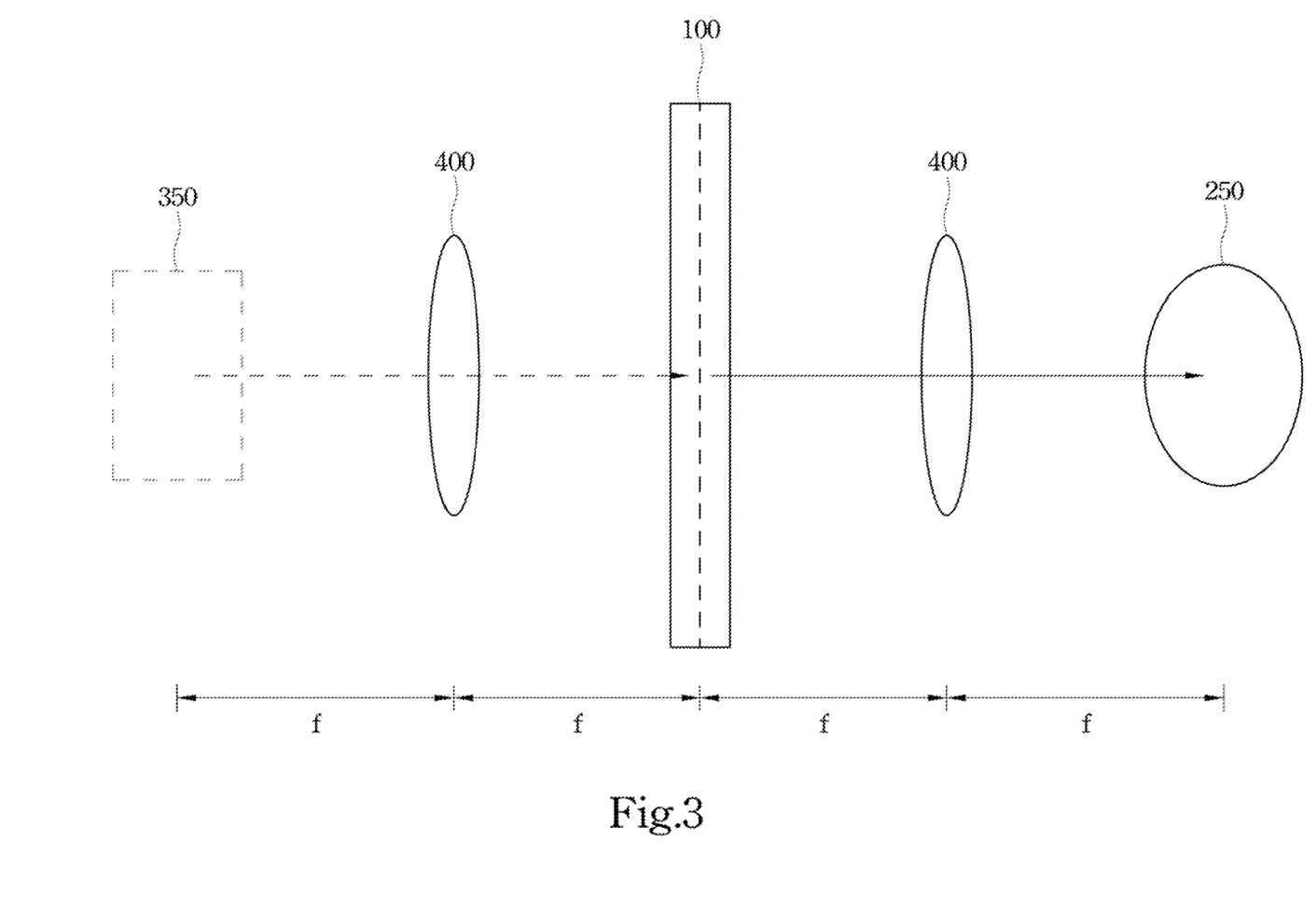
FIG. 3 is a schematic view of the transmission gratings of FIG. 1 when the data is read.

FIG. 3 is a schematic view of the transmission gratings 500 of FIG. 1 when the data is read. When the data is read, the spatial light modulator (SLM) provides a real image formed by a reading beam 350 passing through the real image at the front focal plane of the lens 400, wherein the optical field of the reading beam 350 is substantially the same as the optical field of the reference beam 300. The lens 400 focuses the reading beam 350 onto the collinear holographic storage medium 100. Then, the reading beam 350 diffracts on the interference pattern in the collinear holographic storage medium 100. The lens 400 projects the diffracted beam 250 onto its front focal plane, thereby forming an image at its front focal plane. The optical field of the diffracted beam 250 is substantially the same as the optical field of the signal beam 200. An image sensor can be used to detect the diffracted beam 250, thereby reading the data recorded in the collinear holographic storage medium 100, i.e. the interference pattern.

Figure 4:
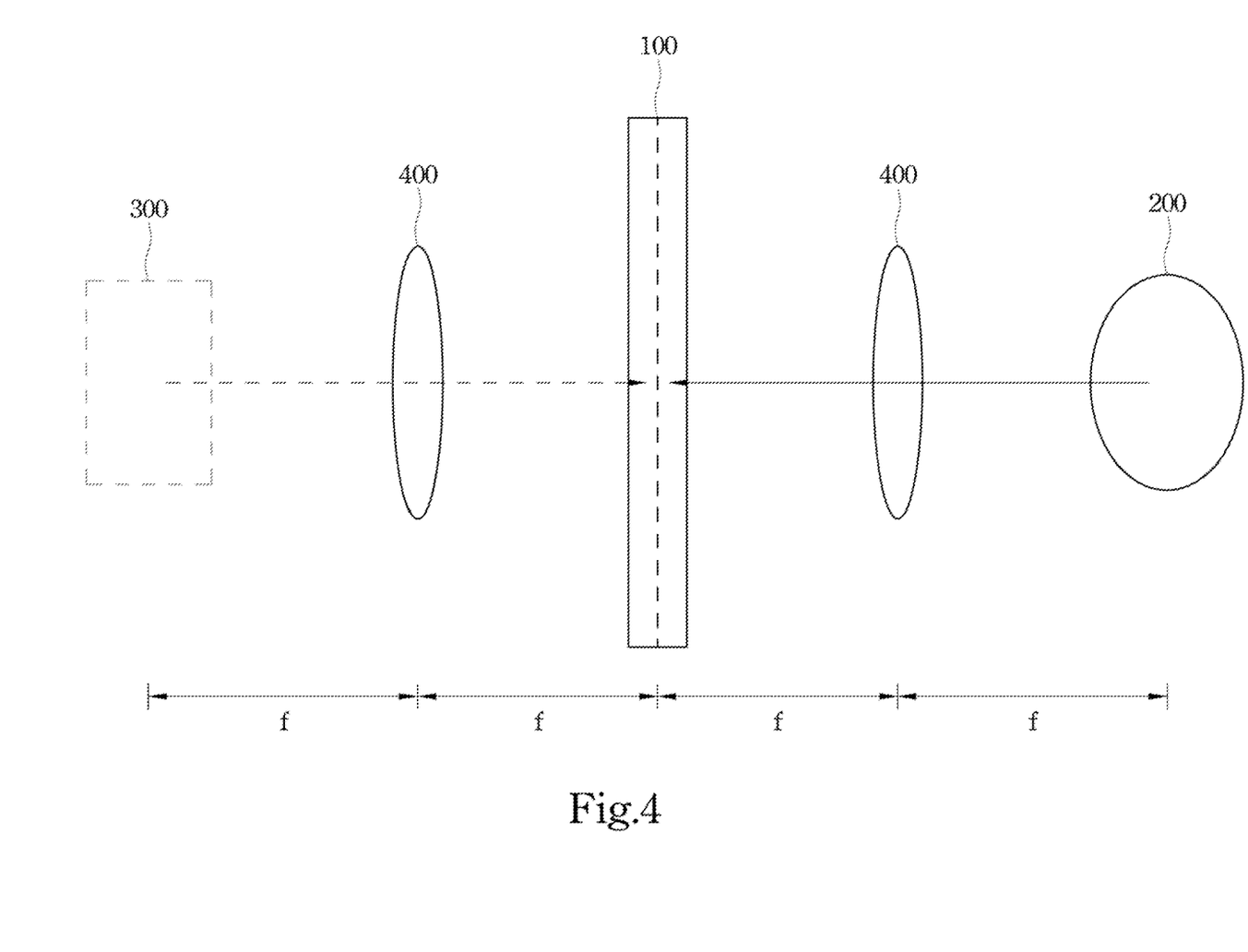
FIG. 4 is a schematic view of the reflection gratings of FIG. 1 when the data is written.

FIG. 4 is a schematic view of the reflection gratings 600 of FIG. 1 when the data is written. The signal beam 200 and the reference beam 300 are collinear but have opposite incident directions. The signal beam 200 and the reference beam 300 illuminate the collinear holographic storage medium 100 and thus create an interference pattern in the collinear holographic storage medium 100.

Figure 5:
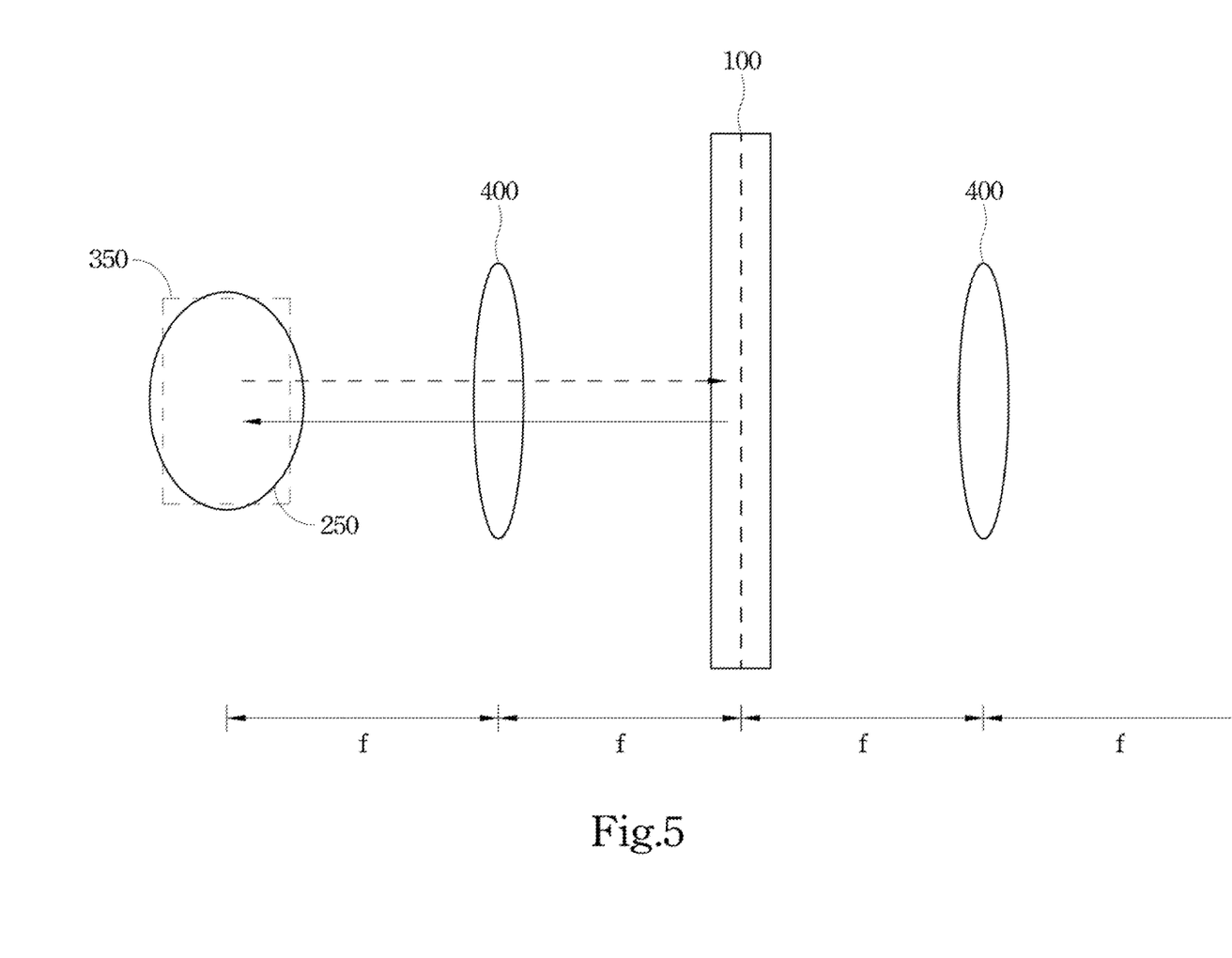
FIG. 5 is a schematic view of the reflection gratings of FIG. 1 when the data is read.

FIG. 5 is a schematic view of the reflection gratings 600 of FIG. 1 when the data is read. When the data is read, the spatial light modulator (SLM) provides a real image formed by a reading beam 350 passing through the real image at the front focal plane of the lens 400, wherein the optical field of the reading beam 350 is substantially the same as the optical field of the reference beam 300. The lens 400 focuses the reading beam 350 onto the collinear holographic storage medium 100. Then, the reading beam 350 diffracts on the interference pattern in the collinear holographic storage medium 100. The lens 400 reversely projects the diffracted beam 250 onto its front focal plane, thereby forming an image at its front focal plane. The optical field of the diffracted beam 250 is substantially the same as the optical field of the signal beam 200. An image sensor may be used to detect the diffracted beam 250, thereby reading the data recorded in the collinear holographic storage medium 100, i.e. the interference pattern.

The thermal deformation of the collinear holographic storage medium 100 can change the transmission gratings 500, the reflection gratings 600, and the refractive index of the collinear holographic storage medium 100. As a result of the thermal deformation of the collinear holographic storage medium 100, the diffracted beam 250 is weakened and has a poor point spread function (PSF).

Many research groups believe that this problem can be solved by a tunable laser and/or a new photopolymer with a lower thermal expansion. However, the thermal deformation of the collinear holographic storage medium 100 is still a problem for collinear holography. Therefore, the operational temperature range of a traditional collinear holography system is limited.

The applicants establish a paraxial approximation solution of the diffracted beam 250 produced by the collinear holographic storage medium 100. According to the paraxial approximation solution of the diffracted beam 250, the applicants identify the source of the thermal deformation problem. The thermal deformation problem is due to the lateral linear thermal expansion coefficient of the recording layer 120. The following description will provide a solution to the thermal deformation problem.

Assuming that the defocus aberration due to the change of the refractive index is compensated by the movement of the collinear holographic storage medium 100, i.e. the collinear holographic storage medium 100 is moved according to the change of the refractive index when the data is written and/or read, such that the reflection layer 110 of the collinear holographic storage medium 100 is located at the back focal plane of the lens 400, the paraxial approximation solution of the diffracted beam 250 produced by the collinear holographic storage medium 100 is listed as follows:

$$U_{CCD}\left(\frac{M_\lambda M_x}{M_f}\xi, \frac{M_\lambda M_y}{M_f}\eta\right) =$$

$$\frac{L}{M_z(\lambda f)^2}\left\{e^{jk\frac{4f}{M_f^2 M_\lambda}}\left[U_p\left(\frac{M_x M_\lambda}{M_f}(\xi_2-\xi), \frac{M_y M_\lambda}{M_f}(\eta_2-\eta)\right)\right]\right. \\ \left. U_r^*(\xi_2-\xi_1, \eta_2-\eta_1)U_s(-\xi_1, -\eta_1)\right] \\ \text{sinc}\left(\frac{-L}{2M_z\lambda f^2}\left(\begin{array}{c}(M_z - M_\lambda M_x^2)\xi_2^2 - 2\xi_2(M_z\xi_1 - M_\lambda M_x^2\xi) \\ (M_z - M_\lambda M_y^2)\eta_2^2 - 2\eta_2(M_z\eta_1 - M_\lambda M_y^2\eta)\end{array}\right)\right)\right\} +$$

$$\int\int\int\int\left\{e^{jk4f}\left[U_p^*\left(\frac{M_\lambda M_x}{M_f}(\xi_2-\xi), \frac{M_\lambda M_y}{M_f}(\eta_2-\eta)\right)\right] \\ U_r(\xi_2-\xi_1, \eta_2-\eta_1)U_s(-\xi_1, -\eta_1) \\ \text{sinc}\left(\frac{L}{2M_z\lambda f^2}\left(\begin{array}{c}\frac{L}{M_z\lambda}\left(\frac{2}{M_\lambda}-2M_z\right)+ \\ 2\xi_2(M_\lambda M_x^2\xi - M_z\xi_1)+ \\ 2\eta_2(M_\lambda M_y^2\eta - M_z\eta_1)+ \\ \xi_2^2(M_z - M_\lambda M_x^2)+ \\ \eta_2^2(M_z - M_\lambda M_y^2)+ \\ 2(M_z\xi_1^2 - M_\lambda M_x^2\xi^2)+ \\ 2(M_z\eta_1^2 - M_\lambda M_y^2\eta^2)\end{array}\right)\right)\right\}$$

$$d\xi_1 d\eta_1 d\xi_2 d\eta_2$$

where (1) the refractive index of the recording layer 120 after the change of temperature becomes $M_n$ times that before the change of temperature, the focal length of the lens 400 after the change of temperature becomes $f/M_f$ times that before the change of temperature, and then $M_r = 1/M_n$ (paraxial approximation);

(2) $M_s\lambda$ is the wavelength of light in the recording layer 120, $M_p\lambda$ is the wavelength of the reading beam 350, and then $M_\lambda = M_p/M_n$;

(3) $1/M_x$, $1/M_y$, and $1/M_z$ are the thermal deformation rates of the gratings (including the transmission gratings 500 and the reflection gratings 600) on the x, y, z axes respectively, $G_0(u, v, \Delta z)$ is the gratings before the change of temperature, and then $G_0(M_x u, M_y v, M_z \Delta z)$ is the gratings after the change of temperature;

(4) $\lambda$ is the wavelength of light;

(5) k is the wave number of light;

(6) f is the focal length of the lens 400;

(7) $\Delta Z$ is the distance between the center of the collinear holographic storage medium 100 and the back focal plane of the lens 400;

(8) u and v are lateral coordinates of the collinear holographic storage medium 100;

(9) $U_s$, $U_r$, and $U_p$ are the optical fields of the signal beam 200, the reference beam 300, and the reading beam 350 at the front focal plane of the lens 400 respectively; and (10) L is twice the thickness of the collinear holographic storage medium 100.

The paraxial approximation solution of the diffracted beam 250 seems complex but represents a clear physical meaning. This physical meaning is specified as followings:

$$U_{CCD}\left(\frac{M_\lambda M_x}{M_f}\xi, \frac{M_\lambda M_y}{M_f}\eta\right) \quad (1)$$

is the optical field of the diffracted beam 250 after the change of temperature. The optical field of the diffracted beam 250 on the $\xi$ axis after the change of temperature is $$\frac{M_\lambda M_x}{M_f}$$

times that before the change of temperature. The optical field of the diffracted beam 250 on the η axis after the change of temperature is $$\frac{M_\lambda M_y}{M_f}$$

times that before the change of temperature.

(2) The paraxial approximation solution of the diffracted beam 250 has two sets of braces. The terms in the first set of braces represent the optical field of the diffracted beam 250 produced by the transmission gratings 500. The terms in the second set of braces represent the optical field of the diffracted beam 250 produced by the reflection gratings 600.

In (3) The optical field of the diffracted beam 250 produced by the transmission gratings 500 has a sinc function. If the argument of the sinc function is 0, then the sinc function will not damage the diffracted beam 250 due to the temperature change. Applicants find that if:

$$M_z = M_\lambda M_x^2 = M_\lambda M_y^2 \text{ (at the Gaussian image point } (\xi,\eta)=(\xi_1,\eta_1)),$$

then the argument of the sinc function will be 0. Moreover, $$\frac{1}{M_z} = 1 + \varepsilon_z = 1 + \left(1 + \frac{2\nu}{1-\nu}\right)\alpha T - \frac{2\nu}{1-\nu}\alpha_L T$$

$$M_\lambda = \frac{1}{1+\alpha_n T}$$

where α is the linear thermal expansion coefficient of the material of the recording layer 120 measured when the recording layer 120 is not sandwiched in the collinear holographic storage medium 100, $\alpha_L$ is the lateral linear thermal expansion coefficient of the recording layer 120 measured when the recording layer 120 is sandwiched in the collinear holographic storage medium 100, $\alpha_n$ is the temperature coefficient of the refractive index of the recording layer 120, $\epsilon_z$ is z axial component of the strain of the recording layer 120, T is the temperature difference, and ν is the Poisson's Ratio of the material of the recording layer 120.

The lateral linear thermal expansion coefficient of the recording layer 120 is measured when the recording layer 120 is sandwiched in the collinear holographic storage medium 100. At this time, the recording layer 120 is restrained by other layers of the collinear holographic storage medium 100. Therefore, the linear thermal expansion coefficient of the recording layer 120 is substantially the same as the linear thermal expansion coefficient of the substrates 130 since the shear force is applied to the recording layer 120 by substrates 130.

The linear thermal expansion coefficient of the material of the recording layer 120 is measured when the recording layer 120 is not sandwiched in the collinear holographic storage medium 100. At this time, the recording layer 120 is thermally expanded freely without being restrained by the other layers of the collinear holographic storage medium 100. Therefore, the linear thermal expansion coefficient of the recording layer 120 is isotropic since the shear force is not applied to the recording layer 120 by the other layers of the collinear holographic storage medium 100.

In addition, $$\frac{1}{M_x^2} = \frac{1}{M_y^2} = 1 + 2\alpha_L T,$$

and then $$\alpha_L = \frac{-\alpha_n(1-\nu) + \alpha(1+\nu)}{2}.$$

That is, if the lateral linear thermal expansion coefficient of the recording layer 120 substantially satisfies:

$$\alpha_L = \frac{-\alpha_n(1-\nu) + \alpha(1+\nu)}{2},$$

then the thermal deformation effect on the diffracted beam 250 can be eliminated.

Return to FIG. 1. The collinear holographic storage medium 100 include the reflection layer 110, the recording layer 120, a pair of substrates 130, and a dichroic film 140. The reflection layer 110 and the recording layer 120 are located between the substrates 130. The dichroic film 140 is located between the recording layer 120 and the reflection layer 110.

In order to make the lateral linear thermal expansion coefficient of the recording layer 120 substantially satisfy $$\alpha_L = \frac{-\alpha_n(1-\nu) + \alpha(1+\nu)}{2},$$

the manufacturer can control the lateral linear thermal expansion coefficient of each layer of the collinear holographic storage medium 100, e.g. the reflection layer 110, the substrates 130, and the dichroic film 140, substantially satisfy:

$$\alpha_L^{(n)} = \frac{-\alpha_n(1-\nu) + \alpha(1+\nu)}{2}$$

where $\alpha_L^{(n)}$ is the lateral linear thermal expansion coefficient of each layer of the collinear holographic storage medium 100.

Accordingly, the lateral linear thermal expansion coefficient of the recording layer 120 will substantially satisfy $$\alpha_L = \frac{-\alpha_n(1-\nu) + \alpha(1+\nu)}{2}$$

due to the shear force applied to the recording layer 120.

In some cases, some layers in the collinear holographic storage medium 100 are films, e.g. the reflection layer 110 and the dichroic film 140, or air gaps. The lateral linear thermal expansion coefficients of these layers are very hard to be controlled. Therefore, the manufacturer may control the lateral linear thermal expansion coefficient of the hardest layer in the collinear holographic storage medium 100 substantially satisfy:

$$\alpha'_L = \frac{-\alpha_n(1-v) + \alpha(1+v)}{2}$$

where $\alpha_L'$ is the lateral linear thermal expansion coefficient of the hardest layer in the collinear holographic storage medium 100. The hardest layer in the collinear holographic storage medium 100 means a layer which has the greatest Young's modulus in the collinear holographic storage medium 100, i.e. the layer having the least strain for the same stress in the collinear holographic storage medium 100.

In the present embodiment, the substrates 130 are the hardest layers in the collinear holographic storage medium 100. Therefore, the manufacturer may control the lateral linear thermal expansion coefficients of the substrates 130 substantially satisfy:

$$\alpha'_L = \frac{-\alpha_n(1-v) + \alpha(1+v)}{2},$$

where $\alpha_L'$ is the lateral linear thermal expansion coefficients of the substrates.

Applicants find that the lateral linear thermal expansion coefficient of the recording layer 120 substantially satisfying $$\alpha_L = \frac{-\alpha_n(1-v) + \alpha(1+v)}{2}$$

is substantially the same as the linear thermal expansion coefficient of the material of the recording layer 120. Take a photopolymer including Polymethylmethacrylate (PMMA) for example (v=0.33, $\alpha=2.5\times10^{-4}/°$ C., $\alpha_n=-3\times10^{-4}/°$ C.), $\alpha_L$ is $2.67\times10^{-4}/°$ C., which is substantially the same as $\alpha$ ($\alpha=2.5\times10^{-4}/°$ C.).

Therefore, in practice, the manufacturer may control the lateral linear thermal expansion coefficient of the recording layer 120 be substantially the same as the linear thermal expansion coefficient of the material of the recording layer 120.

Similarly, the manufacturer can control the lateral linear thermal expansion coefficient of each layer of the collinear holographic storage medium 100, e.g. the reflection layer 110, the substrates 130, and the dichroic film 140, such that the lateral linear thermal expansion coefficient of each layer of the collinear holographic storage medium 100 can be substantially the same as the linear thermal expansion coefficient of the material of the recording layer 120.

In some cases, some layers in the collinear holographic storage medium 100 are films, e.g. the reflection layer 110 and the dichroic film 140, or air gaps. The lateral linear thermal expansion coefficients of these layers are very hard to be controlled. Therefore, the manufacturer may control the lateral linear thermal expansion coefficient of the hardest layer in the collinear holographic storage medium 100 be substantially the same as the linear thermal expansion coefficient of the material of the recording layer 120.

The terms "substantially" as used herein may be applied to modify any quantitative representation which could permissibly vary without resulting in a change in the basic function to which it is related. For example, the lateral linear thermal expansion coefficient of the recording layer 120 as disclosed herein being substantially the same as the linear thermal expansion coefficient of the material of the recording layer 120 may permissibly vary within the scope of the invention if its thermal deformation elimination capability is not materially altered.

Specifically, the materials of the substrates 130 and the material of the recording layer 120 may be substantially the same. For example, the substrates 130 may be made of Polymethylmethacrylate (PMMA), and the recording layer 120 may be made of a photopolymer including Polymethylmethacrylate (PMMA). In this way, the lateral linear thermal expansion coefficient of the recording layer 120 can be substantially the same as the linear thermal expansion coefficient of the material of the recording layer 120.

Alternatively, the manufacturer may remove the substrates 130 from the collinear holographic storage medium 100 and only leave the reflection layer 110, the recording layer 120, the dichroic film 140, and glue layers therebetween to eliminate the thermal deformation effect on the diffracted beam 250. That is, the collinear holographic storage medium 100 does not have any layer harder than the recording layer 120. The glue layer may be made of a soft material or a maternal which has a lateral linear thermal expansion coefficient substantially the same as the lateral linear thermal expansion coefficient of the recording layer 120.

Moreover, in order to eliminate the diffracted beam 250 produced by the reflection gratings 600, the collinear holographic storage medium 100 may include a quarter-wave plate 150 located between the recording layer 120 and the reflection layer 110. In use, the quarter-wave plate 150 creates a quarter-wavelength phase shift between the incident beams, e.g. the incident signal beam 210 and the incident reference beam 310, and the reflected beams, e.g. the reflected signal beam 220 and the reflected reference beam 320, such that the incident beams and the reflected beams are orthogonally polarized and are not interfered with each other. Therefore, the diffracted beam 250 produced by the reflection gratings 600 is eliminated.

The quarter-wave plate 150 described above may be made and used in accordance with the quarter-wave plate disclosed in the U.S. Application Publication No.: 2004/0165518 A1. This application is hereby incorporated herein by reference.

Specifically, an azobenzene layer is applied to the dichroic film 140. Then, the collinear holographic storage medium 100 is rotated. The thickness of the azobenzene layer is controlled by the speed of rotation of the collinear holographic storage medium 100. Moreover, linearly polarized light, whose vibration plane is aligned with the radial direction of the collinear holographic storage medium 100, is incident on the azobenzene layer when the collinear holographic storage medium 100 is rotated. The linearly polarized light creates a fast axis and a slow axis in the azobenzene layer, such that the azobenzene layer will have an optical anisotropy. Consequently, the fast axis or the slow axis of the azobenzene layer is parallel with the radial direction of the collinear holographic storage medium 100.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not intended to invoke the provisions of 35 U.S.C. §112, 6th paragraph.

What is claimed is:

1. A collinear holographic storage medium comprising:
a plurality of layers; and
a recording layer sandwiched between the layers, wherein the lateral linear thermal expansion coefficient of the recording layer, being the linear thermal expansion coefficient measured when the recording layer is sandwiched between the layers, is substantially the same as the linear thermal expansion coefficient of the recording layer measured when the recording layer is not sandwiched between the layers.

2. The collinear holographic storage medium of claim 1, wherein the lateral linear thermal expansion coefficient of the recording layer substantially satisfies:

$$\alpha_L = \frac{-\alpha_n(1-v) + \alpha(1+v)}{2}$$

where $\alpha_L$ is the lateral linear thermal expansion coefficient of the recording layer, an $\alpha_n$ the temperature coefficient of the refractive index of the recording layer, $\alpha$ is the linear thermal expansion coefficient of the recording layer measured when the recording layer is not sandwiched between the layers, and $v$ is the Poisson's Ratio of the material of the recording layer.

3. The collinear holographic storage medium of claim 1, wherein at least one of the layers is a substrate, wherein the recording layer is disposed above the substrate, the lateral linear thermal expansion coefficient of the substrate, being the linear thermal expansion coefficient measured when the substrate is in the collinear holographic storage medium, is substantially the same as the linear thermal expansion coefficient of the recording layer measured when the recording layer is not sandwiched between the layers.

4. The collinear holographic storage medium of claim 1, wherein the lateral linear thermal expansion coefficient of the hardest one among the layers, being the linear thermal expansion coefficient measured when the hardest one among the layers is in the collinear holographic storage medium, is substantially the same as the linear thermal expansion coefficient of the recording layer.

5. The collinear holographic storage medium of claim 1, wherein at least one of the layers is a substrate, wherein the recording layer is disposed above the substrate, and the lateral linear thermal expansion coefficient of the substrate substantially satisfies:

$$\alpha'_L = \frac{-\alpha_n(1-v) + \alpha(1+v)}{2}$$

where $\alpha_L'$ is the lateral linear thermal expansion coefficient of the substrate, being the linear thermal expansion coefficient measured when the substrate is in the collinear holographic storage medium, $\alpha_n$ is the temperature coefficient of the refractive index of the recording layer, $\alpha$ is the linear thermal expansion coefficient of the recording layer measured when the recording layer is not sandwiched between the layers, and $v$ is the Poisson's Ratio of the material of the recording layer.

6. The collinear holographic storage medium of claim 1, wherein the lateral linear thermal expansion coefficient of the hardest one among the layers substantially satisfies:

$$\alpha'_L = \frac{-\alpha_n(1-v) + \alpha(1+v)}{2}$$

where $\alpha_L'$ is the lateral linear thermal expansion coefficient of the hardest one among the layers, being the linear thermal expansion coefficient measured when the hardest one among the layers is in the collinear holographic storage medium, $\alpha_n$ is the temperature coefficient of the refractive index of the recording layer, $\alpha$ is the linear thermal expansion coefficient of the recording layer measured when the recording layer is not sandwiched between the layers, and $v$ is the Poisson's Ratio of the material of the recording layer.

7. A collinear holographic storage medium comprising:
a plurality of layers; and
a recording layer sandwiched between the layers, wherein the lateral linear thermal expansion coefficient of the recording layer substantially satisfies:

$$\alpha_L = \frac{-\alpha_n(1-v) + \alpha(1+v)}{2}$$

where $\alpha_L$ is the lateral linear thermal expansion coefficient of the recording layer, being the linear thermal expansion coefficient measured when the recording layer is sandwiched between the layers, $\alpha_n$ is the temperature coefficient of the refractive index of the recording layer, $\alpha$ is the linear thermal expansion coefficient of the recording layer measured when the recording layer is not sandwiched between the layers, and $v$ is the Poisson's Ratio of the material of the recording layer.

8. The collinear holographic storage medium of claim 7, wherein the lateral linear thermal expansion coefficient of the recording layer, being the linear thermal expansion coefficient measured when the recording layer is sandwiched between the layers, is substantially the same as the linear thermal expansion coefficient of the recording layer measured when the recording layer is not sandwiched between the layers.

9. The collinear holographic storage medium of claim 7, wherein at least one of the layers is a substrate, wherein the recording layer is disposed above the substrate, the lateral linear thermal expansion coefficient of the substrate, being the linear thermal expansion coefficient measured when the substrate is in the collinear holographic storage medium, is substantially the same as the linear thermal expansion coefficient of the recording layer measured when the recording layer is not sandwiched between the layers.

10. The collinear holographic storage medium of claim 7, wherein the layers comprise:
a reflection layer;
a dichroic film located between the recording layer and the reflection layer; and
a substrate, wherein the reflection layer is disposed above the substrate, the lateral linear thermal expansion coefficient of the hardest one among the substrate, the dichroic film, and the reflection layer, being the linear thermal expansion coefficient measured when the hardest one among the substrate, the dichroic film, and the reflection layer is in the collinear holographic storage medium, is substantially the same as the linear thermal expansion coefficient of the recording layer.

11. The collinear holographic storage medium of claim 7, wherein at least one of the layers is a substrate, wherein the recording layer is disposed above the substrate, and the lateral linear thermal expansion coefficient of the substrate substantially satisfies:

$$\alpha'_L = \frac{-\alpha_n(1-v) + \alpha(1+v)}{2}$$

where $\alpha_L'$ is the lateral linear thermal expansion coefficient of the substrate, being the linear thermal expansion coefficient measured when the substrate is in the collinear holographic storage medium, $\alpha_n$ is the temperature coefficient of the refractive index of the recording layer, $\alpha$ is the linear thermal expansion coefficient of the recording layer, and $v$ is the Poisson's Ratio of the material of the recording layer.

12. The collinear holographic storage medium of claim 7, wherein the lateral linear thermal expansion coefficient of the hardest one among the layers substantially satisfies:

$$\alpha'_L = \frac{-\alpha_n(1-v) + \alpha(1+v)}{2}$$

where $\alpha_L'$ is the lateral linear thermal expansion coefficient of the hardest one among the layers, being the linear thermal expansion coefficient measured when the hardest one among the layers is in the collinear holographic storage medium, $\alpha_n$ is the temperature coefficient of the refractive index of the recording layer, $\alpha$ is the linear thermal expansion coefficient of the recording layer measured when the recording layer is not sandwiched between the layers, and $v$ is the Poisson's Ratio of the material of the recording layer.

13. The collinear holographic storage medium of claim 7, wherein the collinear holographic storage medium does not have any layer harder than the recording layer.

14. The collinear holographic storage medium of claim 7, wherein the layers comprise:
a reflection layer,
a pair of substrates, wherein the reflection layer and the recording layer are located between the substrates, and the materials of the substrates and the material of the recording layer are substantially the same.

15. The collinear holographic storage medium of claim 7, wherein the layers comprise:
a reflection layer; and
a quarter-wave plate located between the recording layer and the reflection layer.

* * * * *